United States Patent [19]

Jacko et al.

[11] 4,332,085
[45] Jun. 1, 1982

[54] ROPE HELIX GAGE

[75] Inventors: John Jacko, Hamilton Township, Mercer County, N.J.; William F. Stack, Middletown Township, Bucks County, Pa.

[73] Assignee: United States Steel Corporation, Pittsburgh, Pa.

[21] Appl. No.: 168,229

[22] Filed: Jul. 10, 1980

[51] Int. Cl.³ .............................................. G01B 5/02
[52] U.S. Cl. ................... 33/143 R; 33/143 L
[58] Field of Search ............ 33/147 R, 147 N, 147 L, 33/143 R, 143 L, 178 R, 178 E, 174 L, 174 P, 174 PA

[56] References Cited

U.S. PATENT DOCUMENTS 1,105,217  7/1914  Stegmaier ........................ 33/143 R
3,226,833  1/1966  Lemelson ........................ 33/143 L
3,440,738  4/1969  Mangan ........................ 33/147 L X

*Primary Examiner*—Harry N. Haroian
*Attorney, Agent, or Firm*—John F. Carney

[57] ABSTRACT

Apparatus is described for mechanically determining the helix height of a preformed strand containing a plurality of helically wound wires for use in the production of wire rope. The apparatus includes a base support for maintaining the dimensional integrity of the strand during the measurement procedure; plural adjustable sensors for determining the locus of the outer peripheral points at a plurality of locations along the length of the strand in order to obtain a sample along an extended length of the strand; and means for conveniently and accurately determining a representative helix height over the concerned strand length.

12 Claims, 10 Drawing Figures

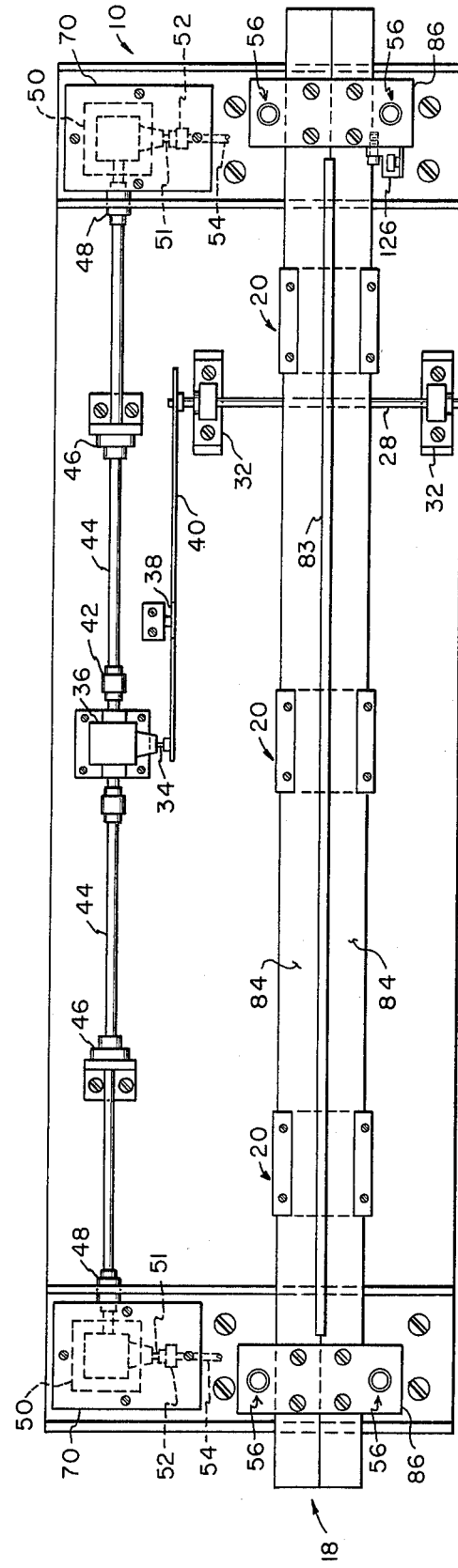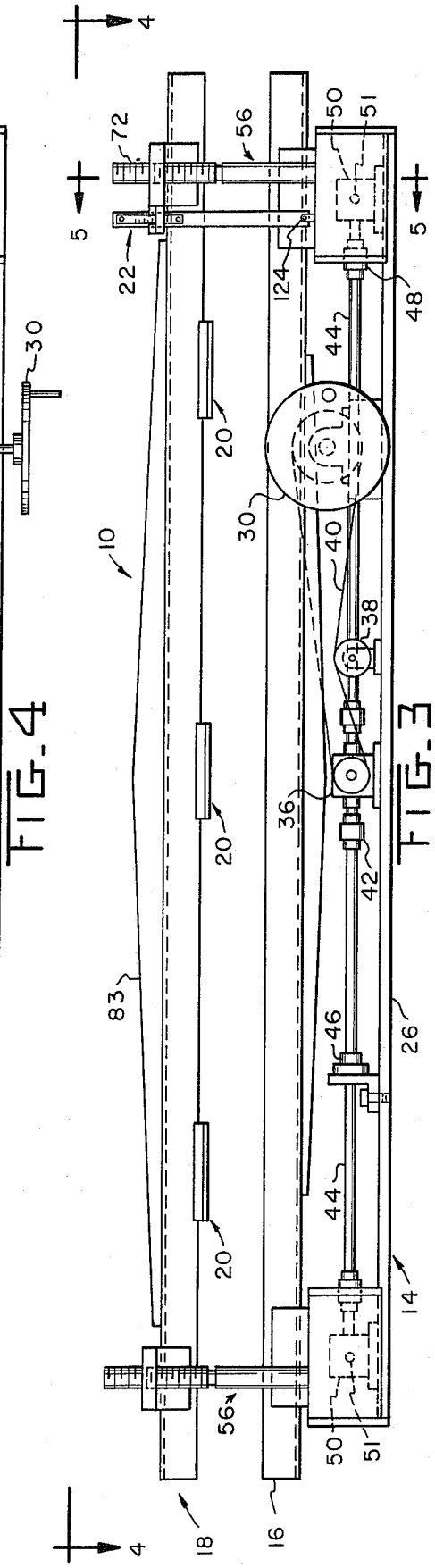

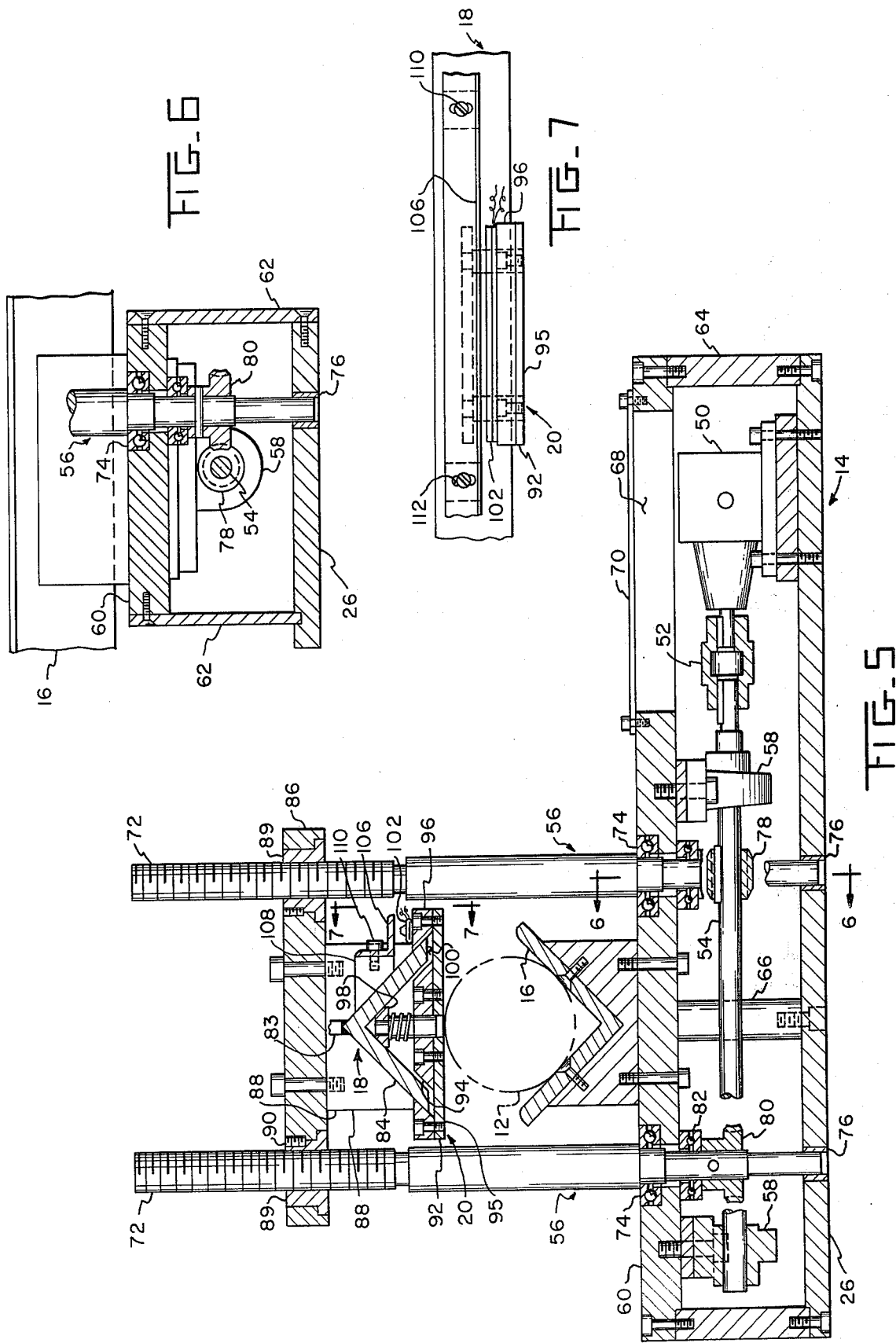

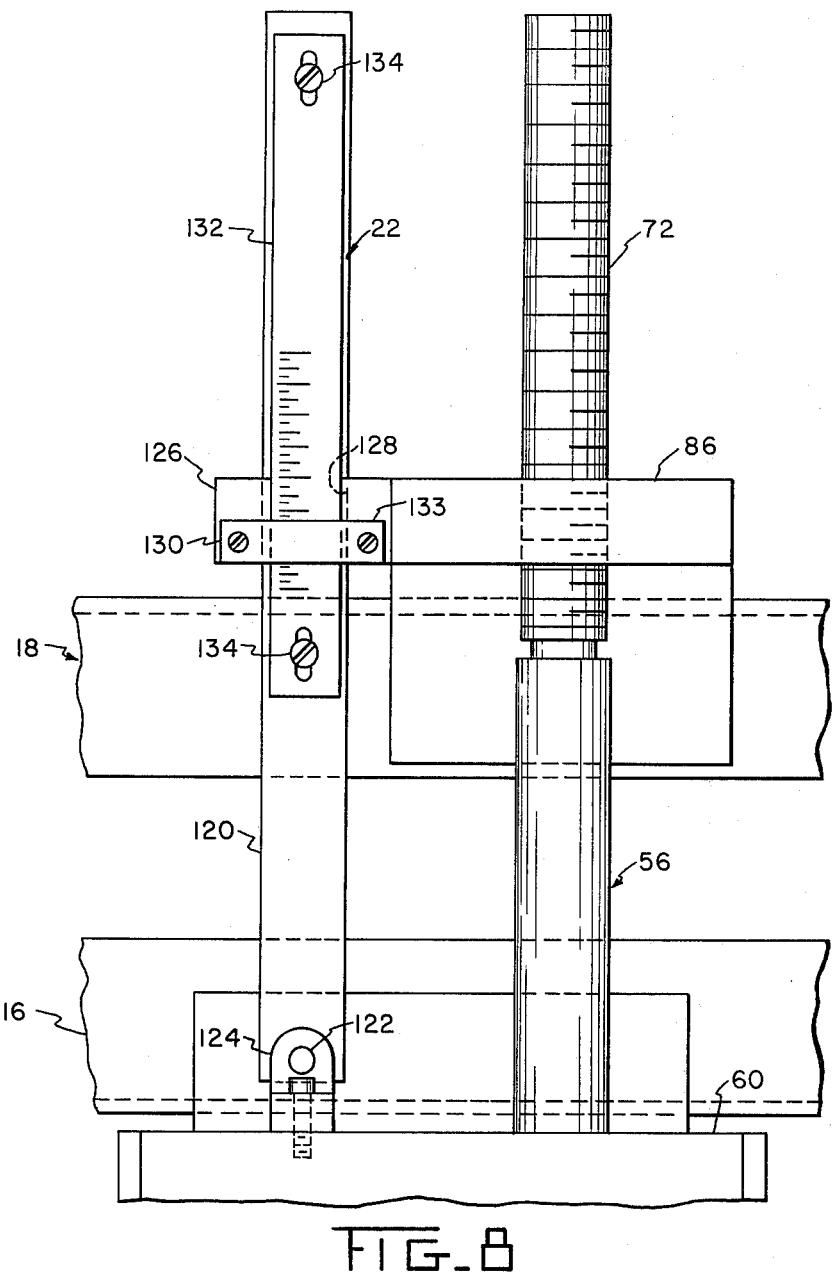
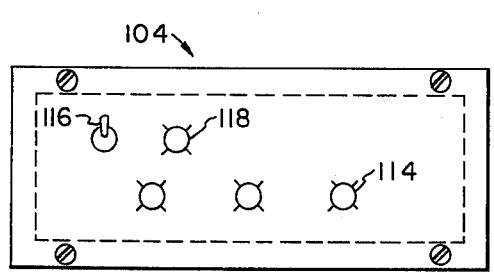
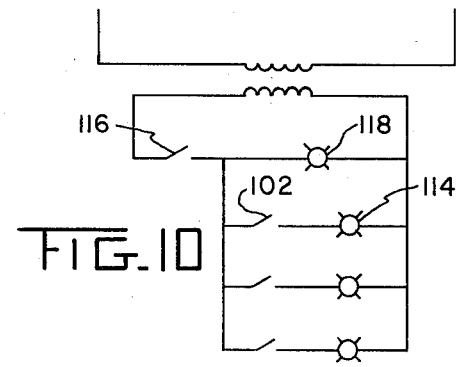

ROPE HELIX GAGE

BACKGROUND

In the manufacture of wire rope, a plurality of wires is helically wound into strands that are, themselves, twisted with uniform pitch and direction around a core that may be fibrous or metallic. The individual strands, prior to being twisted into a rope, are preformed into a helical shape having a slightly smaller diameter than that assumed by the strand in the finished rope. In this way, the strands that comprise the rope are caused to more tightly encircle the core thereby enhancing the strength of the finished product.

In order to insure uniformity of product and of strand pitch it is necessary that each strand be preformed into a helix having prescribed dimensions. Thus, before the strands are twisted about the core, it is customary to measure each or a representative sample of strands in order to insure that they have been preformed within acceptable dimensional tolerance. Such measurement is conveniently obtained by simply measuring the height, or external diameter, of the helically wound strand; however, in the past such measurement has been obtained by simply visually gauging the helix height against a graduated scale. Obviously, the accuracy of visual measurement in this manner is highly suspect.

It is to the amelioration of the aforementioned problem, therefore, that the present invention is directed.

BRIEF DESCRIPTION OF THE DRAWINGS

FIGS. 1 and 2 are side and end views respectively of a typical helically preformed wire rope strand with which the present invention is utilized;

FIG. 3 is an elevational view of apparatus according to the present invention;

FIG. 4 is a plan view of the apparatus of FIG. 3;

FIG. 5 is a sectional view taken along line 5—5 of FIG. 3;

FIG. 6 is a partial sectional view taken along line 6—6 of FIG. 5;

FIG. 7 is a partial elevational view of the presser bar utilized in the present apparatus;

FIG. 8 is a representation of the sensor readout arrangement utilized in the present apparatus;

FIG. 9 illustrates the indicator panel utilized in conjunction with the sensor readout arrangement of FIG. 8; and FIG. 10 is a diagram of the electrical circuit utilized in the indicator panel of FIG. 9.

DESCRIPTION OF A PREFERRED EMBODIMENT OF THE INVENTION

The several drawing figures illustrate gage apparatus 10 according to the present invention for effectively determining the helix height H (FIGS. 1 and 2) of a helically preformed strand 12 of twisted wire material having a pitch P, such as for example, as is used in the production of wire rope. The gage apparatus 10 comprises a base 14 mounting the operative parts of the apparatus. These include an elongated seat 16 for mounting the strand 12 to be measured, a movable beam 18 in parallel overlying relation to the seat 16 and adjustably mounting a plurality of sensor assemblies 20 which cooperated with the seat to determine the diametral or helix height H of the strand 12 when the sensor assemblies 20 are brought into contact with the member 12 upon movement of the beam. A scale 22 secured to the apparatus is operatively disposed with respect to the beam 18 to enable a direct determination of helix height from the position of an index fixed to the beam relative to the scale.

The base 14 comprises a rectangular plate 26 mounting the drive train for driving the apparatus including a power input shaft 28 journaled for manual rotation by handwheel 30 in pillow blocks 32. The output end of shaft 28 is operatively connected to the input shaft 34 of a two-way gear box 36 by means of a chain and sprocket drive which, as shown in FIG. 4, may be arranged to increase the rotational velocity of the input to the gear box 36. A tension idler 38 mounted on the plate 26 is operative to impart tension to the drive chain 40. The gear box 36 houses a conventional 1:1 gearing arrangement that is connected via couplings 42 to oppositely extending output shafts 44. The output shafts 44 are each rotatably journaled by cartridge bearings 46 and connect at their ends via couplings 48 to the input shafts of gear boxes 50 whose output shafts 51 are disposed at right angles with respect to the input shafts. The output shafts 51 of the gear boxes 50 connect via couplings 52 to the drive shafts 54 for lift screws 56 that are operative to raise and lower the beam 18 as described hereinafter. The shafts 54 are journaled for rotation within pillow blocks 58 that are suspendedly mounted from the top plates 60 that are disposed along the respective ends of the plate 26 and in vertically spaced relation thereto. Elongated side plates 62 and end plates 64 serve to vertically support the top plates 60 as well as to cooperate therewith in enclosing the gear boxes 50, drive shafts 54 and associated members in the drive train. An intermediate support post 66 may be interposed between the plate 26 and respective top plates 60 to provide additional support therebetween. Openings 68 covered by removable cover plate 70 are provided in the top plates 60 to provide access to the enclosed part of the base.

The lift screws 56 are arranged in pairs at the respective ends of the beam 18 with the screws in each pair being positioned on opposite sides of the beam. Each lift screw 56 comprises a vertically disposed cylindrical rod whose upper end is threaded as at 72 and whose lower end is stepped for journaling in a roller bearing 74 positioned in the top plate 60 and a bushing 76 in the base plate 26. All of the lift screws 56 are rotatably driven in unison to raise or lower beam 18 by worms 78 secured to the drive shafts 54 that engage worm wheels 80 on the respective lift screws. As shown, axial thrust bearings 82 are provided between the worm wheels 80 and the respective top plate 60.

The beam 18, which comprises an elongated member stiffened by stiffener brace 83 having downwardly divergent sides 84, is movably coupled at its ends to each pair of lift screws 56 by means of movable supports 86 that extend transversely of the beam. Beam 18 is fixedly secured to the respective movable supports 86 through mounting blocks 88 that are angularly recessed to receive the beam and to which the beam is weldedly attached. The supports 86 to which the blocks 88 are boltedly connected each contain a pair of internally threaded fixed nuts 89 keyed thereto by pins 90 by means of which nuts alternate upward or downward movement is imparted to the beam depending upon the direction of rotation of the lift screws 56.

The beam 18 is arranged to carry a plurality of sensor assemblies 20 that are adjustably mounted thereon to be manually aligned with each of the respective upwardly facing crowns C on the strand 12 to be measured. Each sensor assembly 20 includes a rectangular sensor plate 92 that may be stiffened against deflection by a stiffener rib 94. Plate 92 presents a downwardly facing surface 95 adapted to engage the strand 12 at its adjacent crown C when the beam 18 is lowered for the purpose of taking a measurement as hereinafter explained. As shown, plate 92 is slidably retained on the beam by a pair of elongated gibs 96 disposed along opposite sides of the plate and having bearing surfaces adapted to engage the facing surfaces of the beam 18.

Plate 92 in each assembly 20 is biased downwardly from the lower ends of the sides 84 of beam 18 by a pair of spring actuated pressure pads 98 in order to present a slight clearance space 100 between the plate and the beam when the latter is in its retracted position. A ribbon switch 102 is secured to one of the gibs 96 and electrically connected to an indicator panel 104. An actuator arm 106 is fixedly attached to the beam 18 by mounting blocks 108 adapted to receive threaded connectors 110. The arm 106 is arranged to be spaced from the switch 102 when the beam is retracted by an amount corresponding to the clearance space 100. Elongated slots 112 through which the connectors 110 pass are provided in the actuator arm 106 in order to permit calibrating adjustment of each sensor assembly 20.

Each sensor assembly 20 is independently connected to an indicator light 114 on the panel 104. The panel also contains an actuating switch 116 to provide power to the panel and an associated indicator light 118 adapted to indicate that the panel is electrically operative. As shown in FIG. 10, the indicating lights 114 and 118 are connected in a simple series—parallel circuit together with switches 102 on each sensor assembly 20 and the power switch 116.

The described arrangement of sensor assemblies is such that when beam 18 is lowered to cause the sensor assemblies 20 to engage each of the facing crowns C of the subject strand 12, the strand is urged downwardly into the seat 16 thereby eliminating any camber in the strand before the switch 102 is actuated by the arm 106 indicating that the associated portion of the strand is properly seated for measurement. As is apparent, the indicator lights 114 are operative to inform the workman, when all of the respective sensor assemblies have properly seated the strand specimen to enable an accurate measurement thereof to be taken from the scale 22.

The scale member 22 utilized in the described apparatus is best shown in FIG. 8 and comprises an upstanding standard 120 that is mounted atop one of top plates 60 closely adjacent a set of lift screws 56. The standard 120 is connected at its lower end via a pivot pin 122 in a clevis 124 to permit the scale to accommodate any wobble in the lift screws or minor misadjustment in the apparatus without detracting from the accuracy of the measurement. A bracket 126 fixed to the adjacent movable support 86 is provided with a slide recess 128 that slidably receives the standard 120, the latter being secured therein by an index plate 130 connected to the bracket in overlying relation to the standard.

The scale member 22 comprises a scale plate 132 containing appropriate graduations for determining the helix height of the strand specimen. The scale plate 132 is adjustably connected for calibration purposes via connectors 134 to the standard 120, its disposition thereto being such as to permit a readily determinable reading representative of the helix height H of the strand to be read from the position of the upper edge 133 of the index plate 130 with respect to the scale plate 132.

The operation of the hereindescribed apparatus is as follows. A specimen length of preformed strand 12 is removed from a wire rope and placed in the seat 16 of the apparatus 10. The length of strand selected preferably contains at least three crowns C or, in other words, contains at least two pitches P in order to provide a representative indication of the helix height H. Thereafter, the respective sensor assemblies are positionally adjusted along the beam 18 so as to dispose each over the respective crowns C of the strand 12. The workman next operates the handwheel 30 to lower the beam 18 with respect to the strand specimen thereby bringing the respective sensor plates 92 into engagement with the adjacent crowns C. Initial contact of the plates 92 with the strand 12 operates to lightly press the strand and thereby eliminate any bow or camber that may exist in the specimen. Continued lowering of the beam 18 via operation of the handwheel 30 after the plate 92 once makes contact with the strand effects contact of the operator arm 106 with the switch 102 illuminating the appropriate indicating light 114 on the panel 104. When all of the indicating lights have been illuminated the workman has an indication that the sensor assemblies are in engagement with the strand along the specimen length whereby the helix height H thereof can be read directly from the graduated scale plate 132. Having this information readily and accurately determinable, the workman is able to make appropriate adjustments in the strand preforming apparatus when such may be required in order to bring the strand 12 within prescribed tolerance limits for uniformity of the wire rope product.

It will be appreciated that different size strand specimens can be conveniently measured in the same apparatus.

Various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for determining the helix height of a length of a helically wound member having a plurality of longitudinally spaced crowns comprising:
   (a) an elongated seat for receiving the material to be gaged;
   (b) a movable beam superposed above said seat in substantial parallel relation thereto;
   (c) longitudinally adjustable sensor assemblies adapted to contact each of the respective crowns slidably attached to said beam;
   (d) a scale fixed with respect to said seat;
   (e) means for parallelly moving said beam with respect to said seat for placing said sensor assemblies in engagement with each of the respective crowns including:
     (i) support means attaching said beam adjacent opposite ends thereof;
     (ii) internally threaded nut means in said support;
     (iii) externally threaded lift screws engaging the respective of said nut means; and
     (iv) means for rotatably driving said lift screws;
   (f) independently actuable signal means on each of said sensor assemblies for indicating contact of the associated assembly with the adjacent crown; and (g) an index fixedly connected to said beam in operative relation to said scale to permit direct readout of the helix height of said member when all of said signal means have been actuated.

2. Apparatus according to claim 1 in which said lift screws are arranged in pairs and oppositely spaced from said beam; said movable support extending transversely of said beam and containing therein longitudinally spaced fixed nuts threadedly engaging said each of said lift screws.

3. Apparatus according to claim 1 in which said seat is cooperable with said sensor assemblies to engage said material at circumferentially spaced points about the helix.

4. Apparatus according to claim 3 in which said seat comprises an elongated member having upwardly divergent planar sides for reception of said member.

5. Apparatus according to claim 4 in which said sensor assemblies each include a sensor plate having a planar surface adapted for point contact with said member.

6. Apparatus according to claim 1 in which said sensor assemblies each comprise:
(a) a sensor plate having a downwardly facing planar surface for engagement with said member;
(b) means for slidably connecting said sensor plate to said beam; and
(c) means for biasing said sensor plate in spaced relation from said beam.

7. Apparatus according to claim 6 including a pressure actuable switch attached to one of said sensor plate or said beam; a switch operator fixed to the other, said switch operator being operable to actuate said switch when said sensor plate contacts said member; electrically operated signal means actuable upon actuation of said switch.

8. Apparatus according to claim 7 in which said switch comprises a ribbon switch substantially coextensive with said sensor plate.

9. Apparatus according to claim 7 in which said signal means comprises indicating lights associated each with one of said sensor plates.

10. Apparatus according to claim 1 in which said scale extends vertically in closely spaced parallel relation to one of said lift screws; bracket means connecting said index to said movable support mounted on said lift screw; and said bracket means being slidably received on said scale.

11. Apparatus according to claim 10 including means for pivotally mounting said scale at its base.

12. Apparatus according to claim 1, in which said lift screw drive means comprises transmission means including a gear box having
(a) a rotatable input shaft;
(b) a pair of oppositely extending rotatable output shafts driven by said input shaft; and
(c) means for operatively connecting each of said output shaft to the respective lift screws.

* * * * *

UNITED STATES PATENT AND TRADEMARK OFFICE
CERTIFICATE OF CORRECTION

PATENT NO. : 4,332,085
DATED : June 1, 1982
INVENTOR(S) : John Jacko and Wallace F. Stack It is certified that error appears in the above—identified patent and that said Letters Patent is hereby corrected as shown below:

On the front page, under "Inventors", change the name of the co-inventor "William F. Stack" to -- Wallace F. Stack --.

Signed and Sealed this

Ninth Day of November 1982

[SEAL]

Attest:

GERALD J. MOSSINGHOFF

Attesting Officer

Commissioner of Patents and Trademarks